United States Patent
Shankarappa et al.

(10) Patent No.: US 7,272,254 B2
(45) Date of Patent: Sep. 18, 2007

(54) SYSTEM AND METHOD FOR ANALYZING AND IDENTIFYING FLAWS IN A MANUFACTURED PART

(75) Inventors: Suneel Tumkur Shankarappa, Bangalore (IN); Gregory Alan Mohr, Scotia, NY (US); Mysore Siddu Dinesh, Bangalore (IN); Brian Walter Lasiuk, Niskayuna, NY (US); Ronald Cecil McFarland, Cincinnati, OH (US); Elizabeth Lokenberg Dixon, Delanson, NY (US)

(73) Assignee: General Electric Company, Niskayuna, NY (US)

( * ) Notice: Subject to any disclaimer, the term of this patent is extended or adjusted under 35 U.S.C. 154(b) by 889 days.

(21) Appl. No.: 10/615,402

(22) Filed: Jul. 9, 2003

(65) Prior Publication Data

US 2005/0008213 A1    Jan. 13, 2005

(51) Int. Cl.
*G06K 9/00* (2006.01)
(52) U.S. Cl. ...................... 382/149; 382/154
(58) Field of Classification Search ........ 382/141–149, 382/154; 348/92
See application file for complete search history.

(56) References Cited

U.S. PATENT DOCUMENTS

| | | | |
|---|---|---|---|
| 4,755,753 A * | 7/1988 | Chern | 324/237 |
| 5,475,613 A * | 12/1995 | Itoga et al. | 702/39 |
| 5,774,568 A | 6/1998 | Freneix | |
| 5,818,718 A * | 10/1998 | Thomas et al. | 700/119 |
| 6,064,759 A * | 5/2000 | Buckley et al. | 382/154 |
| 6,118,540 A | 9/2000 | Rashford et al. | |
| 6,205,239 B1 * | 3/2001 | Lin et al. | 382/149 |
| 6,341,153 B1 | 1/2002 | Wahawisan et al. | |
| 6,466,643 B1 | 10/2002 | Bueno et al. | |
| 6,539,107 B1 | 3/2003 | Michael et al. | |
| 6,614,872 B2 | 9/2003 | Bueno et al. | |
| 6,618,465 B2 | 9/2003 | Mohr et al. | |
| 6,714,831 B2 * | 3/2004 | Matthews et al. | 700/110 |
| 6,950,548 B1 * | 9/2005 | Bachelder et al. | 382/145 |

OTHER PUBLICATIONS

V-D Nguyen et al., "Exhaustive Detection of Manufacturing Flaws as Abnormalities," 1998 IEEE Comp. Soc. Conf, Jun. 23-25, 1998. pp. 945-952.
European Search Report, EP 04254062, Oct. 29, 2004.

* cited by examiner

*Primary Examiner*—Daniel Mariam
(74) *Attorney, Agent, or Firm*—Penny A. Clarke; Patrick K. Patnode

(57) ABSTRACT

A system and method for identifying flaws in a part being inspected includes generating a 3-d representation of the part, the 3-d representation comprising 3-d spatial coordinates corresponding to different locations on the part, and registering the 3-d spatial coordinates with corresponding locations of a part being inspected. An image of the part being inspected is generated, and a flaw in the part being inspected is identified from the generated image. A location of the flaw is correlated to a corresponding 3-d spatial coordinate, and a device is controlled to perform an operation on the part being inspected at the flaw location using information of the corresponding 3-d spatial coordinate.

24 Claims, 4 Drawing Sheets

SYSTEM AND METHOD FOR ANALYZING AND IDENTIFYING FLAWS IN A MANUFACTURED PART

FIELD OF THE INVENTION

The present invention relates generally to manufacturing and inspection systems and, more particularly, to a system and method for analyzing and identifying flaws or defects in manufactured parts.

BACKGROUND OF THE INVENTION

Non-destructive evaluation (NDE) techniques and procedures for manufactured parts are moving towards a completely digital infrastructure in data acquisition, image inspection, review and archiving. The main purpose of these inspections is to identify flaws or defects in the part. The inspection provides an opportunity to make a decision whether to accept, repair, rework, or discard the part based on the number and severity of the flaws detected. The sensitivity and dynamic range of digital detectors have allowed the detection and localization of flaws that have previously been undetectable in film radiographs. The fast throughput of multi-image inspections and precision placement of the source and detector in industrial inspections have allowed the localization of multiple flaws at a precision of 10 microns in the transverse direction on the surface of the part.

Conventional flaw detection systems are incapable of translating a flaw coordinate as identified on a radiograph to a real physical part in an automated, precise, and reproducible manner. Rather, such systems require manual superposition of a 2-d visual image with the 3-d part, which is very susceptible to error as it relies completely on operator judgment. This effect is exacerbated in the case of complex parts that are inspected multiple times from different points of reference.

It would be desirable to be able to automate the translation of the localized indication on the digital image to the physical part and carry out this operation in a completely digital framework which unifies the design, manufacture, inspection, service, and rework phases.

SUMMARY OF THE INVENTION

Briefly, in one aspect of the invention, a system and method for identifying flaws in a part being inspected includes generating a 3-d representation of the part, the 3-d representation comprising 3-d spatial coordinates corresponding to different locations on the part, and registering the 3-d spatial coordinates with corresponding locations of a part being inspected. An image of the part being inspected is generated, and a flaw in the part being inspected is identified from the generated image. A location of the flaw is correlated to a corresponding 3-d spatial coordinate, and a device is controlled to perform an operation on the part being inspected at the flaw location using information of the corresponding 3-d spatial coordinate.

Further features, aspects and advantages of the present invention will become apparent from the detailed description of preferred embodiments that follows, when considered together with the accompanying figures of drawing.

DETAILED DESCRIPTION OF THE PREFERRED EMBODIMENT

Figure 1:
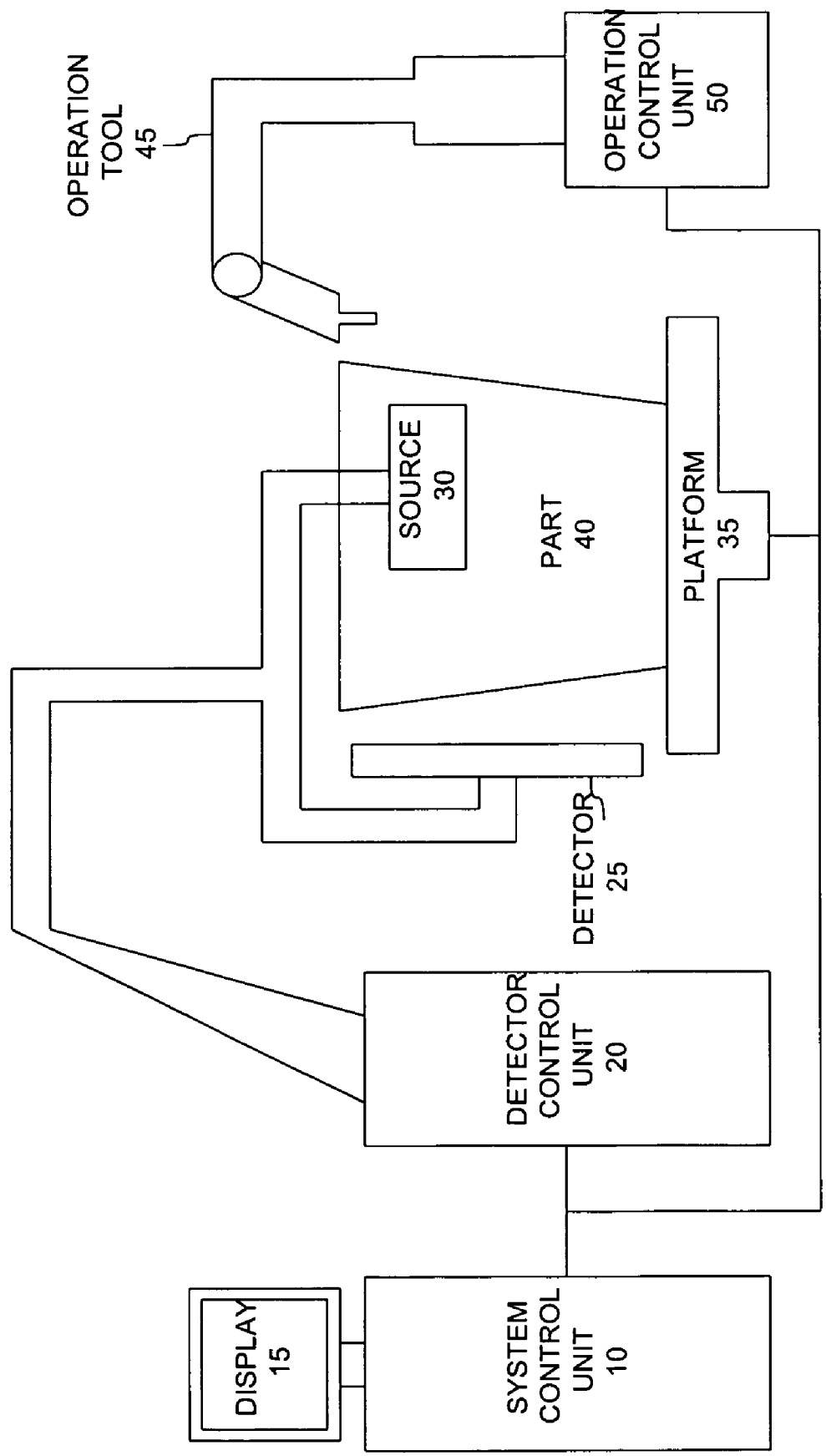
FIG. 1 is a structural diagram of an image forming apparatus consistent with the present invention.

FIG. 1 is a block diagram of an automated part analysis system consistent with the present invention. As shown in FIG. 1, the system includes a system control unit 10, a detector control unit 20, and an operation control unit 30. A display 15 is coupled to the system control unit 10. A detector 25 and a source 30 are coupled to the detector control unit 20. An operation tool 45 is coupled to the operation control unit 50. The system also includes a platform 35 supporting a part 40.

The system control unit 10 can be implemented as a workstation, such as a PC or a server. The system control unit 10 preferably includes a CPU, a main memory, a ROM, a storage device and a communication interface all coupled together via a bus. The CPU may be implemented as a single microprocessor or as multiple processors for a multi-processing system. The main memory is preferably implemented with a RAM and a smaller-sized cache. The ROM is a non-volatile storage, and may be implemented, for example, as an EPROM or NVRAM. The storage device can be a hard disk drive or any other type of non-volatile, writable storage.

The communication interface for the system control unit 10 provides a two-way data communication coupling to the detector control unit 20, the platform 35 and the operation control unit 50. These elements can be coupled directly to the system control unit 10, either through a direct wire connection or a wireless link, or indirectly, such as though a server. In any such implementation, the communication interface sends and receives electrical, electromagnetic or optical signals, which carry digital data streams representing different types of information, to and from the coupled elements.

The detector control unit 20 can include a workstation, implemented in the same manner system control unit 10. The detector control unit 20 may also include a microcontroller. The detector control unit 20 controls the positioning and operation of the detector 25 and the source 30. The signals for controlling the positioning and operation of the detector 25 and source 30 can be provided through direction by a user at the detector control unit 20 or via signals sent from the system control unit 10.

Initially, the part 40 is centered on the platform 35 at a registered location, or equivalently a registered position or registered coordinates, for a particular rotational position and axial height. The part 40 is placed in such a manner that the 3-d spatial coordinates of the part model are mapped to the corresponding locations of the part 40 being inspected including the mapping of the rotational orientation. The positioning can be done, for example, by aligning a fiducial mark on the part 40 with a reference mark on the platform 35. It is also possible to have the part 40 register itself with a laser scanning a fiducial mark on the part 40 and automatically rotating and translating the model in order to align the part 40 being inspected with the 3-d model. This positioning allows the part 40 to be removed and replaced in the identical orientation for subsequent processing, and provides a mechanism to have a definite correlation between the part model, described below, and the part 40 being inspected. The mapping of the part model in the coordinate system of the inspection and analysis system allows a data fusion between a digital model of the part 40 and the digital image data generated by the detector 25 and source 30 of the actual part 40. This allows a streamlining of the inspection, analysis, annotation, and rework processes.

The detector 25 and source 30 are implemented to generate two dimensional (2-d) images of the part 40. The detector 25 and source 30 can be configured to generate, for example, X-ray images, ultrasound images, eddy current images, or infrared images. Although shown as separate elements, the detector 25 and source 30 can be implemented as a single element, depending upon the type of imaging to be performed.

Before an image is generated by the detector 25 and source 30, the detector control unit 20 positions them to generate an image of the part 40 from a particular vantage point. The positioning can be done through input signals to the detector control unit 20 identifying where to position the detector 25 and the source 30. Alternatively, the detector 25 and source 30 can be positioned manually. When the detector 25 and source 30 are in a designated position, an image is generated of the part 40, and the 2-d digital data representing the image is provided to the system control unit 10 via the detector control unit 20. In addition to providing the image data, the detector control unit 20 can provide positional data to the system control unit 10 identifying the position of the detector 25 and source 30 when the image was generated. The system control unit 10 can display the generated image on the display 15. The display 15 can be implemented, for example, as a CRT, plasma or TFT monitor.

In addition to positioning the detector 25 and source 30 to generate an image of the part 40, the platform 35 can also be adjusted to change the position of the part 40 relative to the detector 25 and source 30. The positional control of the platform 35 can be controlled by signals provided from the system control unit 10, or the platform 35 can be positioned manually. The platform 35 can move the part 40 in a number of different ways including, for example, rotating the part 40 around a central axis of the platform 35 or moving the part 40 along a vertical axis, i.e., up or down. Like the detector 25 and source 30, positional information of the platform 35 can be provided to the system control unit 10. Between the positional information of the detector 25, the source 30, and the platform 35, the system control unit 10 has sufficient data to determine the exact orientation of the part 40 in the generated image.

With the image of the part 40 displayed on the display 15, a user can analyze and inspect the image to determine if there are any flaws or features of interest in the portion of the part 40 shown in the image. A flaw can be, for example, an incomplete weld, a lack of fusion in a weld, an inclusion, a void, a corroded area, a crack, or a rivet, bolt or other component that may compromise the structural integrity or strength of the part 40. The flaws depend, in part, on the type of part 40. The part 40 can be any of a variety of different elements of a device or machine. For example, the part 40 can be tubs or cylinders from a jet engine, windmill blades, castings, forging circuit boards, or any other element for which images generated by the detector 25 can facilitate the identification of flaws that need to be documented, checked and/or corrected.

If the user identifies a flaw in the part 40, the user can make an indication of the location of the flaw directly on the display 15, such as with a pointing device or other location selection mechanism that enables the user to identify the exact location of the flaw in the image. The location of the flaw in the image corresponds to a pixel coordinate that can be translated to the actual location on the part 40 from which the image was generated. This ability to translate the pixel coordinate to the actual location of the flaw on the part 40 enables the user to have an operation performed on the part 40 at the location of the flaw.

Depending upon the type of flaw, a user can direct an operation to be performed on the part 40. The operation can be, for example, marking the location of the flaw on the part, repairing the flaw, painting the flaw, grinding the flaw or other function that may be performed based on the ability to locate the flaw accurately and/or in an automated manner.

The operation is performed by the operation tool 45 under the control of the operation control unit 50. The operation control unit 50 can include a workstation, implemented in the same manner system control unit 10, and may also include a microcontroller. The operation control unit 50, in response to signals from the system control unit 10, controls the operation tool 45 to perform an operation on the part 40 at the location of the flaw. The operation tool 45 can have various changeable configurations depending upon the type of operation to be performed. For example, the operation tool 45 can have a marking tool, a paint tool, a grinding tool, a repair tool or some other tool portion for performing the particular operation. Further, based on the positional information of the part 40 on the platform 35 and the pixel coordinate identified by the user as the location of the flaw, the operation control unit 50 is capable of accurately directing the operation tool 45 to the location of the flaw on the part 40 and perform the operation at the flaw location.

Figure 2:
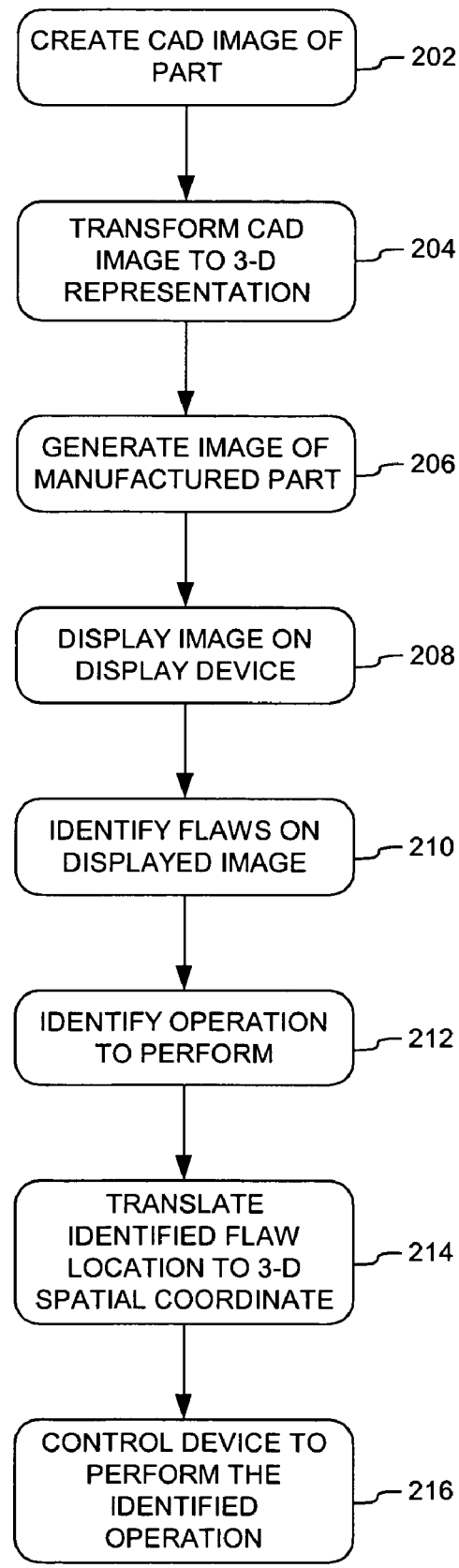
FIG. 2 is a flow diagram of a process for analyzing and identifying flaws on a manufactured part consistent with the present invention.

FIG. 2 is a flow diagram of a process for analyzing and identifying flaws on a manufactured part consistent with the present invention. The process of FIG. 2 will be explained in conjunction with the automated part analysis system of FIG. 1. It should be understood by one skilled in the art that the configuration and implementation of the system of FIG. 1 is exemplary only for performing the process of FIG. 2. It should further be understood that other system configurations and implementations are also possible for performing the process of FIG. 2.

As shown in FIG. 2, a user first creates a CAD image of a part 40 being manufactured (step 202). The CAD image can be created using any number of available CAD applications that are capable of accurately representing the part 40. It is also possible to use a drawing application have similar or equivalent capabilities as a CAD application. The drawing application may be implemented on the system control unit or at a workstation or PC at which a user can prepare the drawing. As described above, the part 40 can be, for example tubs or cylinders from a jet engine, windmill blades, castings, circuit boards, or any other element for which images generated by the detector 25 can facilitate the identification of flaws that need to be documented and/or corrected. To prepare a complete representation of the part 40, the CAD or drawing application may include multiple drawings or images from various vantage points.

The CAD image is then transformed into a three-dimensional (3-d) representation of the part 40 (step 204). The 3-d representation of the part 40 includes a series of 3-d spatial coordinates corresponding to different locations of the part 40, including the exposed surface of the part 40. The CAD application itself preferably includes a transformation function for transforming the CAD image into the 3-d representation. For example, the CAD application can transform the CAD image into an STL format, a well-known 3-d format. The transformation to the 3-d representation is preferably done to a resolution consistent with a desired scale for locating flaws on the part 40. Other 3-d formats, in addition to STL, are also possible.

The 3-d representation comprising the corresponding 3-d spatial coordinates of the part 40 can be stored in a memory, such as a hard disk drive or other non-volatile type memory for future reference. The memory can be implemented in the system control part 10 or be implemented in a location accessible to the system control part 10. The 3-d representation coordinates are set to match part registration coordinates on the platform 35 so that the 3-d spatial coordinates of the 3-d representation match corresponding locations of the actual part 40.

With the 3-d representation of the part 40 generated, stored, and registered to the location of the part 40 being inspected, a 2-d digital image is generated of the part 40 being inspected (step 206). To generate the 2-d digital image, the user can control the detector control unit 20 and platform 35 with the system control unit 10 to place the part 40, the detector 25 and the source 30 to be in a particular position for generating the 2-d digital image at a particular orientation. More specifically, the user can enter instructions at the system control unit 10 for generating an image of a particular orientation of the part 40, which are interpreted by the detector control unit 20 and platform 35 to position the detector 25, the source 30 and the part 40 properly. It is also possible for the user to position these components manually.

More than one image can be generated, for example, to show various orientations and views of the part 40. For the purposes of the following description, the analysis of only one 2-d image will be described. It should be understood, however, that the process for analyzing and applying the one 2-d image is applicable to each 2-d image of the part 40 that is generated. As described above, the 2-d images can be, for example, X-ray images, ultrasound images, eddy current images, or infrared images.

The 2-d image of the part 40, as well as position information sufficient to determine the orientation and portion of the part 40 in the image, is provided to the system control unit 10, which displays the image on the display 15 (step 208). The user can inspect and analyze the displayed image to identify any flaws in the part 40 (step 210). To set the location of an identified flaw, a user can move a pointer, cursor or icon with a pointing device to the flaw location and click on that location to mark it as a flaw. It is also possible for the display 15 to be responsive to touches, like a touch screen, where the user uses a touch element, such as used for a PDA, to mark the location of the flaw. The flaw location corresponds to a particular pixel coordinate of the image. This pixel coordinate can be used to identify the specific physical location of the flaw on the part 40.

In addition to marking the location of the flaw on the part 40, the user can identify a particular operation to perform at the flaw location (step 212). For example, the user can elect to have the operation tool 45 mark the flaw location on the part 40, paint over the flaw location, perform a grinding operation over the flaw location, repair the flaw or some other operation. The particular operation chosen may depend upon the type of flaw, its severity, the actual location of the flaw and the capabilities of the operation tool. The user can select which operation to perform, for example, form a menu of possible operation shown on the display 15.

To perform the operation at the flaw location on the part 40, a transformation is done to identify the flaw location identified on the image to a 3-d spatial coordinate corresponding with the actual physical location on the part 40 (step 214). The transformation can include making a series of rotations and translations from the flaw location identified on the image to the 3-d spatial coordinate corresponding with the actual physical location on the part 40. The transformation can be performed by the system control unit 10. For example, the system control unit 10 can include a processing unit configured to translate the identified flaw location into the actual physical location on the part 40 based on the corresponding pixel coordinate, the positional information of the detector 25, the sensor 30 and the part 40, and the 3-d representation of the part 40 created separately from the imaging of the actual part 40.

Figure 3:
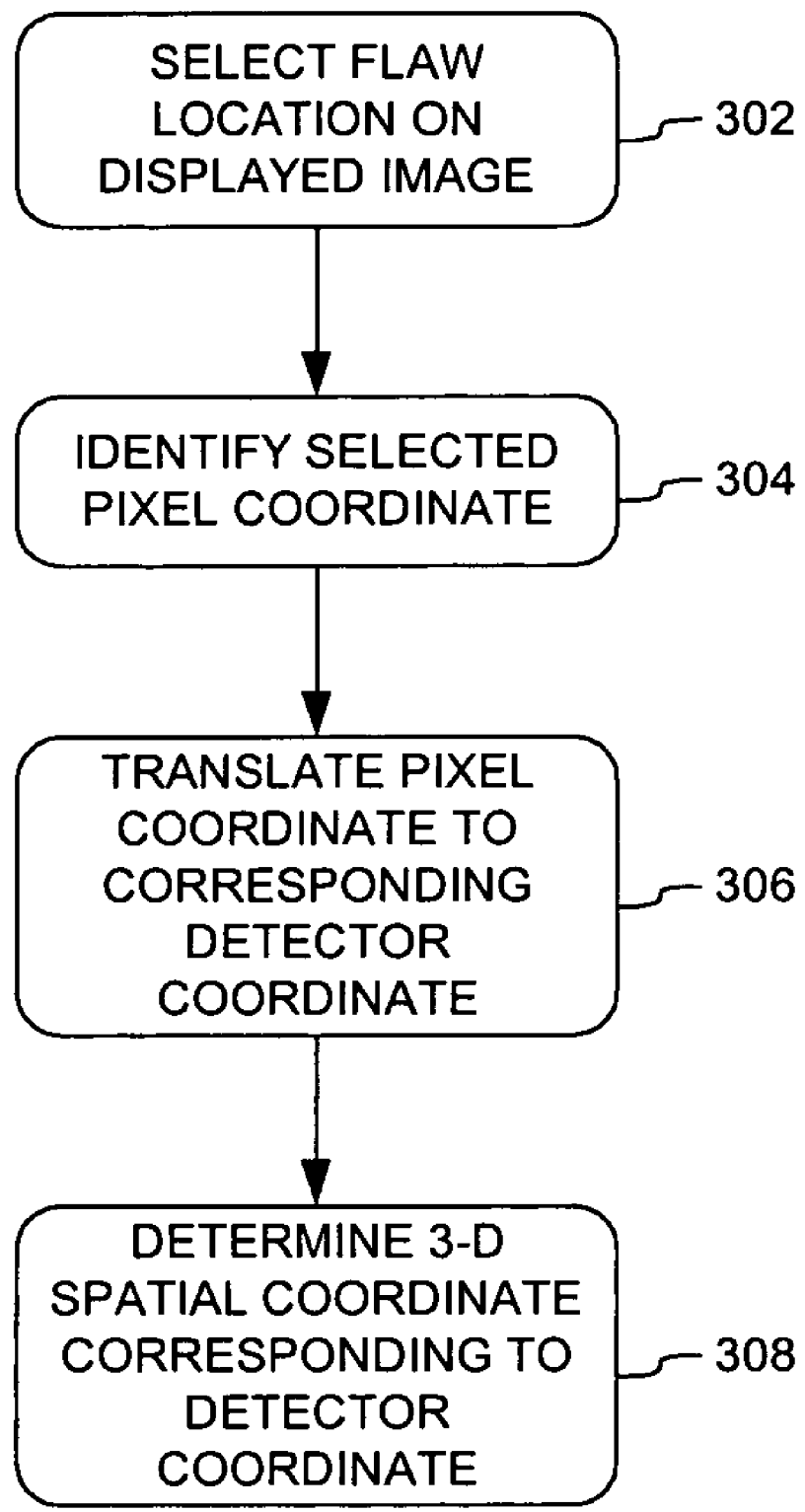
FIG. 3 is a flow diagram of a coordinate translation process consistent with the present invention.

FIG. 3 is a flow diagram of a coordinate translation process consistent with the present invention. The process of FIG. 3 provides further detail regarding how the identified flaw location is translated into the actual physical location of the flaw on the part 40. As shown in FIG. 3, the user first selects the flaw location on the selected image (step 302). The selection of the flaw location is done in accordance with step 210 described above.

In response to the selection of the flaw location, a pixel coordinate is identified (step 304). The flaw location corresponds to a particular pixel coordinate of the image. This pixel coordinate can be used to identify the specific physical location of the flaw on the part 40. The pixel coordinate can be represented as a row and column value of a particular pixel in the image.

The identified pixel coordinate is then translated into a corresponding detector coordinate (step 306). The detector coordinate corresponds to a particular location on the detector 25. The detector coordinate can be represented as a particular location on the detector 25 relative to the center of the detector 25. For example, the detector 25 can be defined to be in a global Y-Z plane, and the center of the detector 25 can be defined as the origin of the Y-Z plane, the X-direction being a normal extending from the origin of the detector 25. In this definition, the detector coordinate corresponds to a particular Y-Z coordinate in the Y-Z plane. The Y-Z coordinate can be measured as a distance, such as in inches, away from the origin rather than as a pixel.

A 3-d spatial coordinate of the part 40 can be determined from the detector coordinate (step 308). The 3-d spatial coordinate of the part 40 corresponds to the location of the flaw on the actual part 40 that is under inspection. Using the detector coordinate, the 3-d spatial coordinate can be determined from the position of the detector 25, the position of the source 30, the position of the part 40 when it was imaged by the detector 25, and the 3-d representation of the part 40 developed from the CAD representation of the part 40. In addition to using the positional information and 3-d representation, the part 40 and the 3-d representation may include identifiable markings to help align the 3-d representation with the part 40 and ensure that the determined 3-d spatial coordinate corresponds more precisely to the location of the flaw on the part 40. The coordinate of the flaw on the actual part 40 lies along the line adjoining the pixel of the detector 25 that had been marked and the source 30. This line corresponds to a line of sight vector, described in more detail below.

Returning to FIG. 3, having determined the 3-d spatial coordinate corresponding to the particular location of the flaw on the part 40, the operation tool 45 is controlled to perform the identified operation at the location of the flaw on the part 40 (step 216). The system control unit 10 signals the operation control unit 50 with information identifying the operation to perform and the 3-d spatial coordinate. In response to the signals, the operation control unit 45 performs the identified operation under the control of the operation control unit 50 at the actual location of the flaw on the part 40. As described above, the operation can be, for example, to place an identifiable mark at the flaw location, to repair the flaw, to paint over the flaw, to grind it, or some other operation that can be performed on the part 40 consistent with the capabilities of the operation tool 45.

Figure 4:
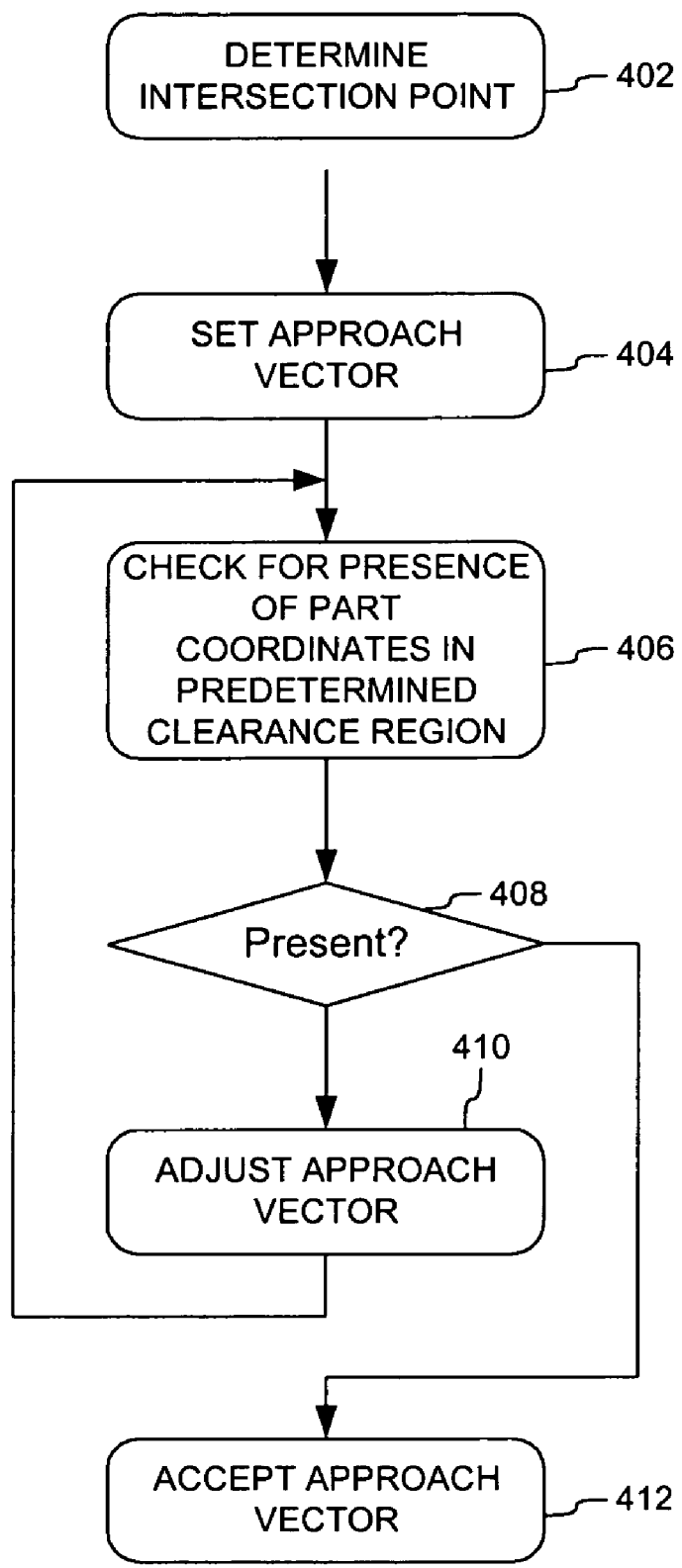
FIG. 4 is a flow diagram of a collision avoidance process consistent with the present invention.

Depending on the shape of the part 40, the operation tool 45 may have to adjust the manner in which it approaches the part 40 to perform the operation at the flaw location. FIG. 4 is a flow diagram of a collision avoidance process consistent with the present invention. The collision avoidance process is an iterative procedure for finding a safe path for the operation tool 45 to approach the surface of the part 40.

As shown in FIG. 4, an intersection point is first determined (step 402). The intersection point corresponds to the 3-d spatial coordinate determined to be the actual location of the flaw on the part 40. This 3-d spatial coordinate is determined in accordance with the process of FIG. 2. Based on the intersection point, an approach vector is set (step 404). The approach vector can initially be set to correspond to any vector on the surface. For example, it can be set to the surface normal at the intersection point. This initial approach vector serves as a first attempt to identify a vector for the operation tool 45 to approach the flaw location of the part 40 without hitting or colliding with some other portion of the part 40.

After the initial approach vector is set, a check is made to determine if there are any 3-d spatial coordinates of the part 40 within a clearance region (step 406). The clearance region corresponds to a minimum amount of space around the intersection normal that is needed for the operation tool 45 to reach the flaw location without being impeded by another portion of the part 40. The clearance region is specified as a 3-d volume of any arbitrary shape, such as a cylinder. The volume is constructed and a search for any 3-d spatial coordinates from the part 40 in this volume is carried out. The size of the 3-d volume, such as the cylinder, corresponds to the size of the portion of the operation tool 45 that is to be operated adjacent to the flaw location.

After searching in the clearance region, a determination is made as to whether or not one of the 3-d spatial coordinates of the part 40 is present in the clearance region (step 408). If none are present, then the current setting for the approach vector is accepted (step 412). The accepted approach vector can then be used to maneuver the operation tool 45 to the flaw location and perform the appropriate operation.

However, if there are one or more 3-d spatial coordinates of the part 40 in the clearance region, the approach vector is adjusted (step 410). Each 3-d spatial coordinate present in the clearance region corresponds to a trouble point that may cause a collision with the operation tool 45 as it approaches the flaw location. The orientation in the polar and azimuthal directions of the trouble points are calculated and stored for future use. As a first attempt to adjust the approach vector, a line of sight vector is determined. The line of site vector corresponds to a clear linear path between the detector 25 and the intersection point on the surface of the part 40. Such a line of site vector typically avoids the points that may be causing the trouble because, for radiography and infrared purposes, the exposure is set up to minimize the amount of material between the source 30, the detector 25, and the region of interest in the image. After adjusting the approach vector to correspond to the line of sight vector, steps 406 and 408 are performed again to determine if there are any part coordinates in the clearance region, which is recalculated in related to the line of sight vector. If no collision points are found, then the line of sight vector is accepted as a safe approach for the operation tool 45.

If part coordinates are found in the clearance region using the line of sight vector as the approach vector, then the approach vector is adjusted again. First, an angular orientation for each coordinate in the clearance region is calculated with respect to the intersection point, either around the initial surface normal or the line of sight vector. The angular orientation is specified by a polar ($\theta$) and azimuthal angle ($\theta$). An analysis is made of the azimuthal distribution of all of the coordinates falling within the clearance region. An angle that most closely corresponds to the complement of the azimuthal angle ($\phi$), which is the azimuthal angle ($\phi$) rotated by 180 degrees in azimuth with respect to the coordinates that may cause the collision, is chosen. The approach vector (i.e., the surface normal or line of sight vector) is rotated by a small angle, such as 20 degrees, in the polar ($\phi$) direction, and then in the azimuthal direction to the coordinates that fell within the clearance region. Having rotated the approach vector, steps 406 and 408 are repeated with the clearance region recalculated in accordance with the rotated approach vector. If there are no part coordinates in the clearance region, then the rotated approach vector is accepted. If there are still part coordinates present, attempts can be made to adjust the approach vector by varying one or both of the polar and azimuthal angles until no part coordinates are present in the clearance region. If, ultimately, no safe approach can be determined, then an error is reported to the user.

The foregoing description of preferred embodiments of the invention has been presented for purposes of illustration and description. It is not intended to be exhaustive or to limit the invention to the precise form disclosed, and modifications and variations are possible in light in the above teachings or may be acquired from practice of the invention. The embodiments were chosen and described in order to explain the principles of the invention and as practical application to enable one skilled in the art to utilize the invention in various embodiments and with various modifications are suited to the particular use contemplated. It is intended that the scope of the invention be defined by the claims appended hereto and their equivalents.

What is claimed is:

1. A method for identifying flaws in a part being inspected, comprising:

generating a 3-d representation of the part, the 3-d representation comprising 3-d spatial coordinates corresponding to different locations on the part;

registering the 3-d spatial coordinates with corresponding locations of the part being inspected;

generating an image of the part being inspected;

identifying a flaw in the part being inspected from the generated image;

correlating a location of the flaw in the part being inspected to a corresponding 3-d spatial coordinate;

controlling a device to perform an operation on the part being inspected at the flaw location using information of the corresponding 3-d spatial coordinates;

identifying an approach vector that enables the device to contact and perform the operation on the part being inspected at the flaw location without obstruction from a portion of the part being inspected; and applying the approach vector to move the device to the flaw location without being obstructed by a portion of the part being inspected.

2. A method according to claim 1, further comprising: displaying the generated image on a display device; and receiving an indication of the location of the flaw in response to an identified location on the display device.

3. A method according to claim 2, further comprising: identifying a pixel location based on the identified location on the display device; and determining the location of the flaw in the generated image based on the identified pixel location.

4. A method according to claim 1, wherein the image is generated by one of X-ray imaging, ultrasound imaging, eddy current imaging, and infrared imaging.

5. A method according to claim 1, further comprising: receiving an indication of which operation the device is to perform on the part being inspected, wherein the operation performed by the device on the part being inspected corresponds to the received indication.

6. A method according to claim 5, wherein the operation is one of a marking and a repair.

7. A method according to claim 1, further comprising: creating a CAD representation of the part; and transforming the CAD representation of the part to generate the 3-d representation of the part.

8. A method according to claim 7, wherein the 3-d representation of the part is in an STL format.

9. A method for identifying flaws in a part being inspected, the method comprising;
generating a 3-d representation of the part, the 3-d representation comprising 3-d spatial coordinates corresponding to different locations on the part;
registering the 3-d spatial coordinates with corresponding locations of the part being inspected;
generating an image of the part being inspected;
identifying a flaw in the part being inspected from the generated image;
correlating a location of the flaw to a corresponding 3-d spatial coordinate;
controlling a device to perform an operation on the part being inspected at the flaw location using information of the corresponding 3-d spatial coordinate;
identifying an approach vector that enables the device to contact and perform the operation on the part being inspected at the flaw location without obstruction from a portion of the part being inspected; and
applying the approach vector to move the device to the flaw location without being obstructed by a portion of the part being inspected, wherein the identifying further includes:
setting an initial approach vector for the device to contact and perform the operation on the part being inspected;
determining whether any surface point of the part being inspected is present in a clearance region adjacent to the initial approach vector; and
accepting the initial approach vector as the approach vector for moving the device to the part being inspected if no surface point is present in the clearance region.

10. A method according to claim 9, wherein the initial approach vector corresponds to a surface normal from the flaw location.

11. A method according to claim 9, wherein the identifying further includes;
adjusting the initial approach vector if at least one surface point is present in the clearance region;
determining whether any surface point of the part being inspected is present in a clearance region adjacent to the adjusted approach vector; and
accepting the adjusted approach vector as the approach vector for moving the device to the part being inspected if no surface point is present in the clearance region.

12. A method according to claim 11, wherein the adjusted approach vector corresponds to a vector providing a clear line of sight between the flaw location and an imaging device for generating the image of the part being inspected.

13. A part analysis system for identifying flaws in a part being inspected, comprising:
a storage unit that stores a 3-d representation of the part, the 3-d representation comprising 3-d spatial coordinates corresponding to different locations on the part;
an imaging device that generates an image of the part being inspected;
a system control unit coupled to the imaging device and the storage unit, the system control unit including a processor and a memory comprising a plurality of instructions executed by the processor, the plurality of instructions configured to register the 3-d spatial coordinates with corresponding locations of the part being inspected, receive the generated image from the imaging device, receive an indication identifying a flaw in the part being inspected, and correlate a location of the flaw to a corresponding 3-d spatial coordinate in the 3-d representation of the part;
an operation tool coupled to the system control unit that performs an operation on the part being inspected at the flaw location based on the corresponding 3-d spatial coordinate correlated by the system control unit,
wherein the memory of the system control unit further comprises instructions configured to:
identify an approach vector that enables the device to contact and perform the operation on the part being inspected at the flaw location without obstruction from a portion of the part being inspected; and
apply the approach vector to move the device to the flaw location without being obstructed by a portion of the part being inspected.

14. A part analysis system according to claim 13, further comprising:
a display device that displays the generated image; and
a flaw identification unit that identifies a location of the flaw on the display device in response to a user input.

15. A part analysis system according to claim 14, wherein the memory of the system control unit further comprises instructions configured to identify a pixel location based on the identified location on the display device and determine the location of the flaw in the generated image based on the identified pixel location.

16. A part analysis system according to claim 13, wherein the imaging device is configured to generate one of an X-ray image, an ultrasound image, an eddy current image, and an infrared image.

17. A part analysis system according to claim 13, wherein the memory of the system control unit further comprises an instruction configured to receive an indication of which operation the operation tool is to perform on the part being inspected, wherein the operation performed by the operation tool on the part being inspected corresponds to the received indication.

18. A part analysis system according to claim 17, wherein the operation is one of a marking and a repair.

19. A part analysis system according to claim 13, further comprising:
a drawing unit configured to creating a CAD representation of the part, and transform the CAD representation of the part to generate the 3-d representation of the part.

20. A part analysis system according to claim 19, wherein the 3-d representation of the part is in an STL format.

21. A part analysis system for identifying flaws in a part being inspected, comprising:
a storage unit that stores a 3-d representation of the part, the 3-d representation comprising 3-d spatial coordinates corresponding to different locations on the part;
an imaging device that generates an image of the part being inspected;
a system control unit coupled to the imaging device and the storage unit, the system control unit including a processor and a memory comprising a plurality of instructions executed by the processor, the plurality of instructions configured to register the 3-d spatial coordinates with corresponding locations of the part being inspected, receive the generated image from the imaging device, receive an indication identifying a flaw in the part being inspected, and correlate a location of the flaw to a corresponding 3-d spatial coordinate in the 3-d representation of the part; and
an operation tool coupled to the system control unit that performs an operation on the part being inspected at the flaw location based on the corresponding 3-d spatial coordinate correlated by the system control unit,
wherein the memory of the system control unit further comprises instructions configured to:
identify an approach vector that enables the device to contact and perform the operation on the part being inspected at the flaw location without obstruction from a portion of the part being inspected;
apply the approach vector to move the device to the flaw location without being obstructed by a portion of the part being inspected;
set an initial approach vector for the device to contact and perform the operation on the part being inspected;
determine whether any surface point of the part being inspected is present in a clearance region adjacent to the initial approach vector; and
accept the initial approach vector as the approach vector for moving the device to the part being inspected if no surface point is present in the clearance region.

22. A part analysis system according to claim 21, wherein the initial approach vector corresponds to a surface normal from the flaw location.

23. A part analysis system according to claim 21, wherein the memory of the system control unit further comprises instructions configured to:
adjusting the initial approach vector if at least one surface point is present in the clearance region;
determining whether any surface point of the part being inspected is present in a clearance region adjacent to the adjusted approach vector; and
accepting the adjusted approach vector as the approach vector for moving the device to the part being inspected if no surface point is present in the clearance region.

24. A part analysis system according to claim 23, wherein the adjusted approach vector corresponds to a vector providing a clear line of sight between the flaw location and the imaging device.

* * * * *